Feb. 5, 1957 R. M. LIKE 2,780,466
PHONOGRAPH TONE ARM RESTORING MECHANISM
Filed Aug. 18, 1950 4 Sheets-Sheet 1
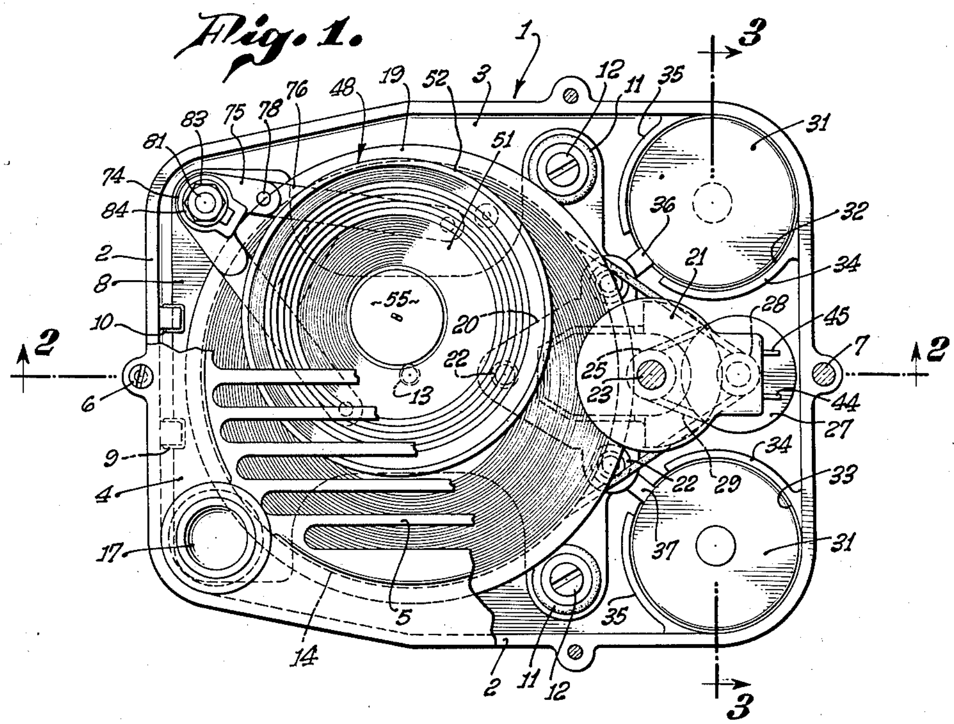
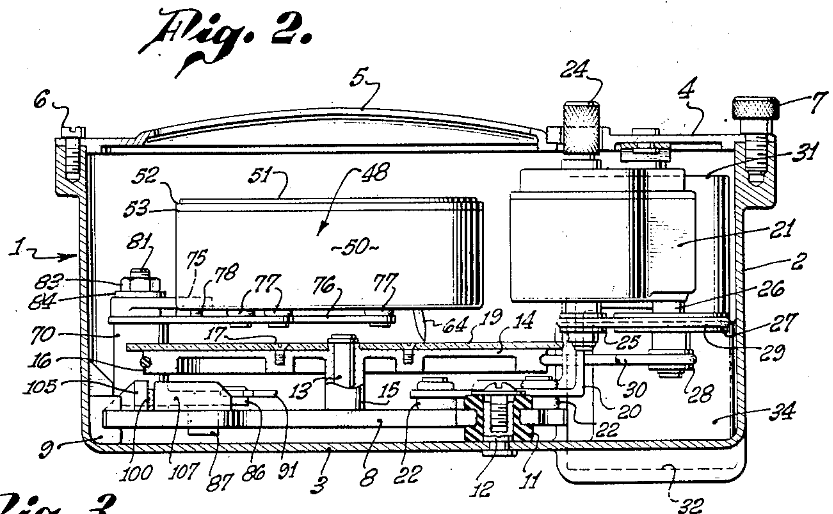
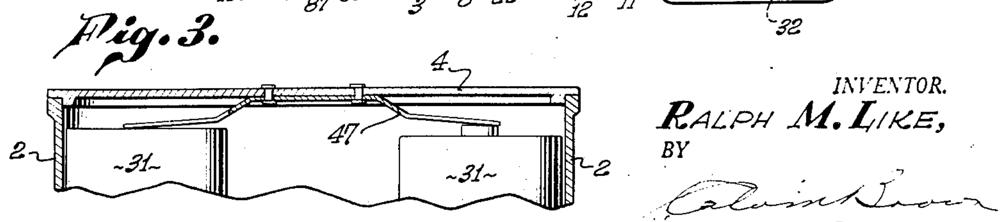
INVENTOR.
RALPH M. LIKE,
BY
ATTORNEY.

PHONOGRAPH TONE ARM RESTORING MECHANISM
Filed Aug. 18, 1950 4 Sheets-Sheet 2
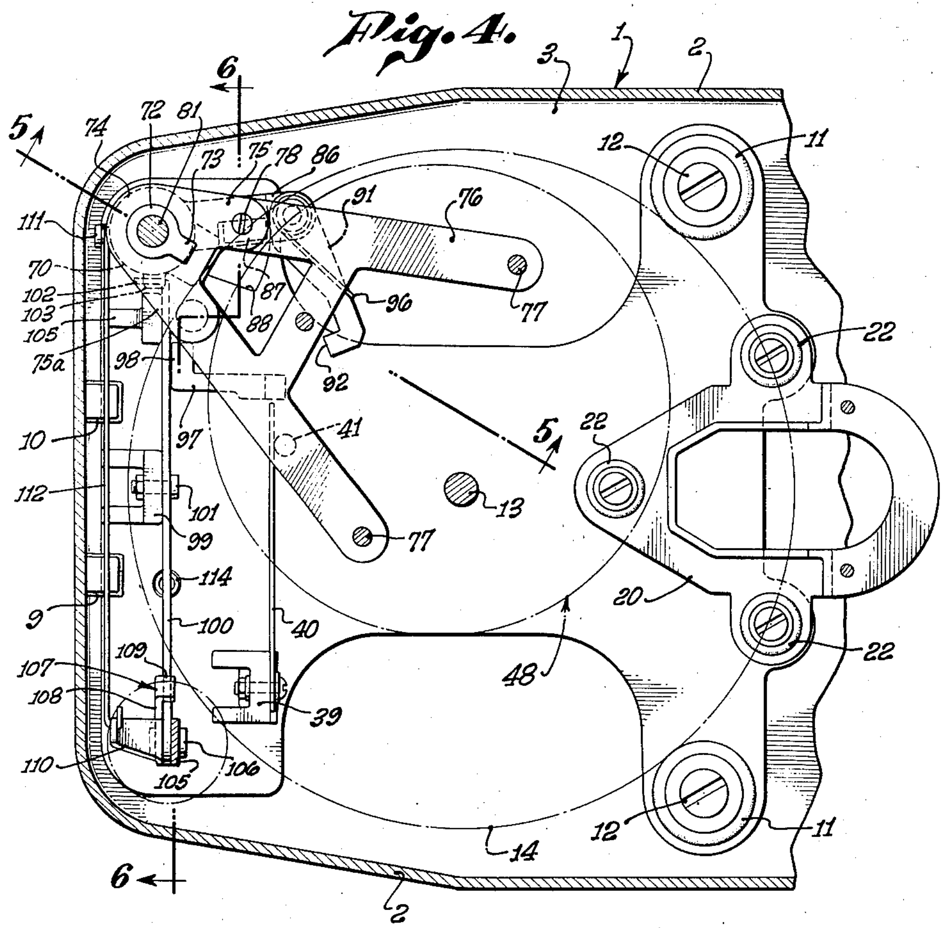
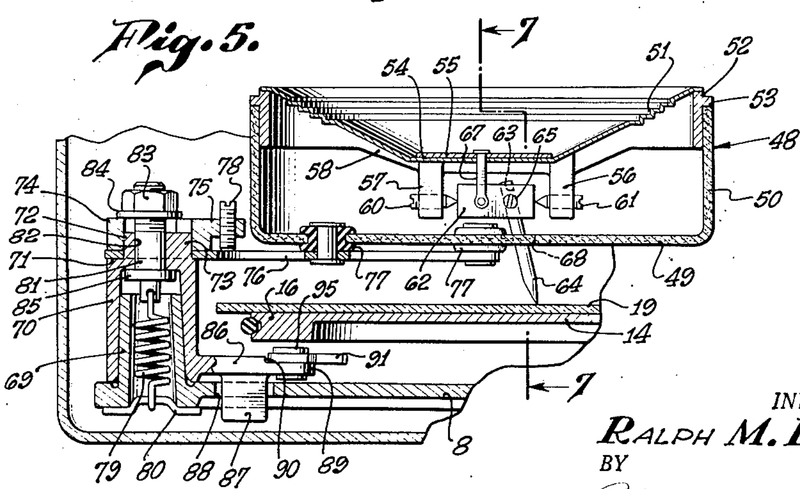
INVENTOR.
RALPH M. LIKE,
BY
ATTORNEY.

Feb. 5, 1957 R. M. LIKE 2,780,466
PHONOGRAPH TONE ARM RESTORING MECHANISM
Filed Aug. 18, 1950 4 Sheets-Sheet 3
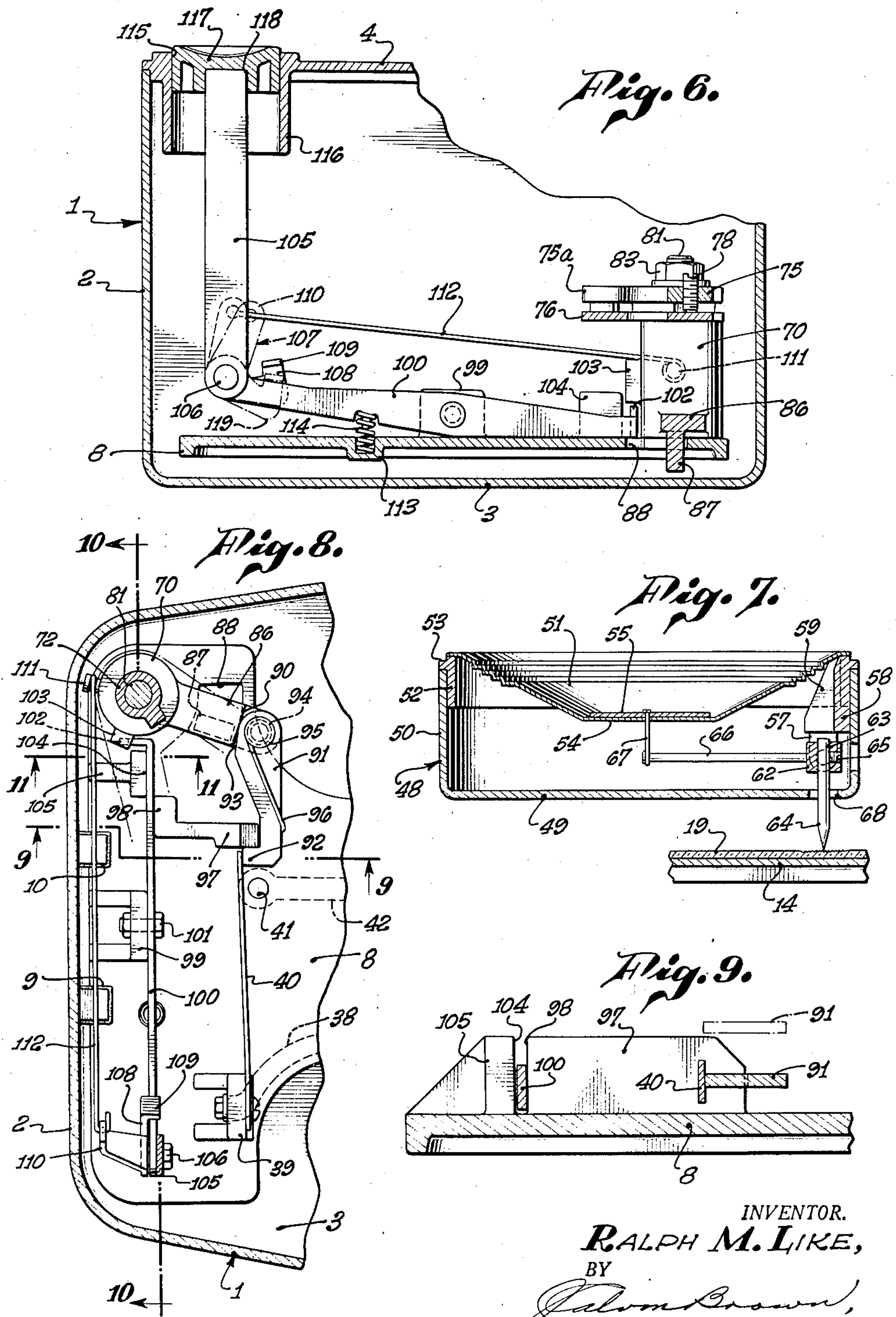
INVENTOR.
RALPH M. LIKE,
BY
[signature]
ATTORNEY.

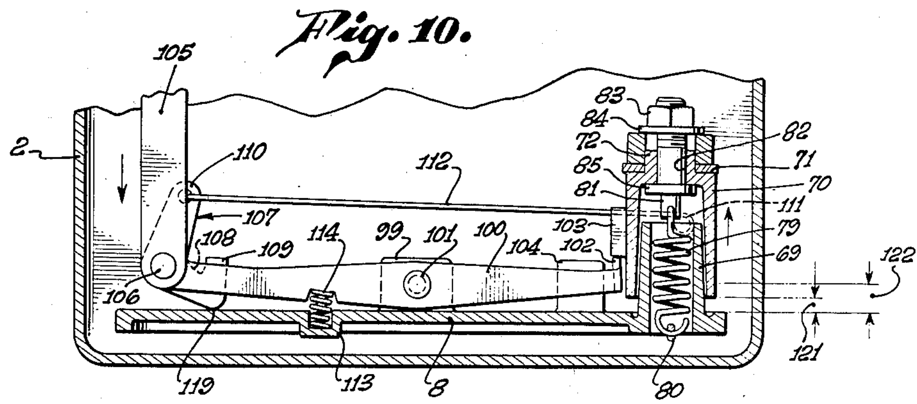
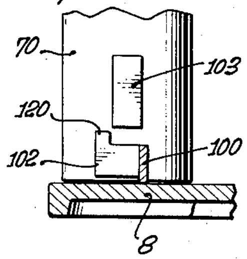
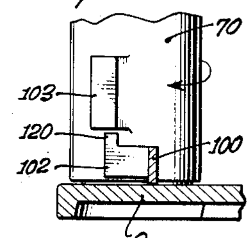
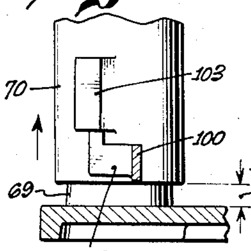
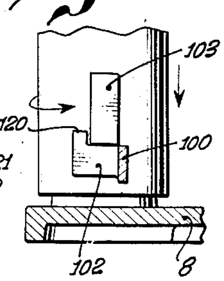
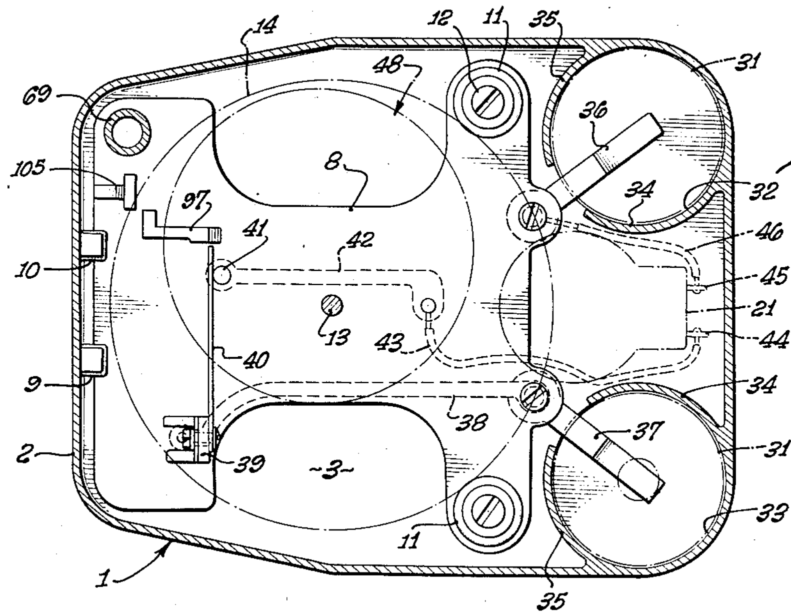
INVENTOR.
RALPH M. LIKE,
BY
[signature]
ATTORNEY.

United States Patent Office 2,780,466

Patented Feb. 5, 1957

2,780,466

PHONOGRAPH TONE ARM RESTORING MECHANISM

Ralph M. Like, Balboa Island, Calif., assignor to Nema Lites, Inc., New York, N. Y., a corporation of Delaware Application August 18, 1950, Serial No. 180,150

4 Claims. (Cl. 274—14)

The present invention is directed to a phonograph of the type which may be incorporated in toys, such as dolls, animals and simulated animals as a sales device and for other purposes where a phonograph having automatic features is desired.

The present phonograph is adapted to utilize a small record of the disc type, together with a reproducing system adapted to play the record. In one adaptation of the invention and where the invention is utilized in dolls, the phonograph design is such as to allow a very rough treatment of the doll without disturbing the phonograph. The phonograph is so arranged that the record may be played without any fear of the stylus jumping the record groove and regardless of the position assumed thereby.

An object of the invention is the provision of a phonograph which is operated in a simple manner and which is provided with reset mechanism adapted to immediately place the reproducer stylus in the commencement groove of the record upon the operator depressing a start button.

A further object is the provision of a phonograph which holds the reproducer stylus with constant pressure in the groove of the record during rotation of the record to prevent the stylus from jumping.

A further object is the provision of a phonograph constituted and arranged to automatically stop upon completion of the playing of the record and without the usual swinging motion that occurs in the usual tone arm of a phonograph.

A further object is to provide positive means, in an electrical driven phonograph, which assures a disconnection of the motor from the electrical source when the playing of the record has been completed, and which means will not be closed resultant upon rough handling of the phonograph. The present invention has its parts so constituted and arranged that electric current is not re-established to the motor except upon actuation of certain of the mechanism.

A further object is the provision of a phonograph that incorporates a novel acoustical system and one that does not use a baffle board.

A further object is the provision of a reproducer mechanism which, while playing within the groove of a disc record, is restrained within said groove against vertical movement while permitting the reproducer to freely oscillate horizontally.

A further object is to provide in a phonograph mounting means which readily absorbs shock incident to rough treatment and which isolates vibration.

A further object is the provision of a phonograph which is compact of structure, has superior tone quality, is positive in operation, inexpensive in cost of manufacture, easily assembled and disassembled, of few parts, and generally superior to devices now known to the inventor.

With the above mentioned and other objects in view, the invention consists in the novel and useful provision, formation, construction, association and relative arrangement of parts, members, and features, all as shown in one embodiment in the accompanying drawings described generally and more particularly pointed out in the claims.

In the drawings:

Figure 1 is a fragmentary top plan view of the phonograph with its mechanism confined within a case;

Figure 2 is a fragmentary sectional view on the line 2—2 of Figure 1;

Figure 3 is a fragmentary sectional view on the line 3—3 of Figure 1;

Figure 4 is a fragmentary plan view, partly in section and on an enlarged scale, of certain mechanism for resetting the reproducer;

Figure 5 is a fragmentary sectional view on the line 5—5 of Figure 4, and showing the reproducer in one position upon a record;

Figure 6 is a fragmentary sectional view on the line 6—6 of Figure 4;

Figure 7 is a sectional view on the line 7—7 of Figure 5;

Figure 8 is a fragmentary view, partly in section, of certain of the mechanism shown in Figure 4, the said mechanism being in moved position from that of Figure 4;

Figure 9 is a fragmentary, enlarged sectional view on the line 9—9 of Figure 8;

Figure 10 is a fragmentary sectional view showing a portion of the mechanism of Figure 6 in a moved position from that of Figure 6;

Figure 11 is a fragmentary sectional view on an enlarged scale and taken on the line 11—11 of Figure 8;

Figure 12 is a view similar to that of Figure 11, one of the parts being moved in the direction of the arrow relative to a second part;

Figure 13 shows two of the parts of Figures 11 and 12 in contact; and

Figure 14 is the position assumed by the two parts of Figures 11, 12, and 13 to effect a locking relationship when one of the parts is revolved in a counterclockwise direction as indicated by the curved arrow; and Figure 15 is a plan view showing the electrical connections through a source of current supply with a motor and a switch.

Referring now with particularity to the drawings, I have provided a case 1 having a side wall 2 and a base wall 3 with overlying cover 4. The cover 4 is provided with a convex grille 5 and the cover is detachably secured to the rim of the side wall in any desired manner, such as by the screws shown at 6 and 7, the side wall of the case being provided with protuberances having screw threaded bores for receiving the screws 6 and 7.

It may be remarked that substantially the actual size of the instrument, to be described, is shown in Figures 1 and 2. An instrument of the character of the present invention is of necessity small in dimension, particularly if it is to be incorporated in toys of the so-called speaking type.

A main supporting frame 8 is detachably secured to the base 3. In particular this main supporting frame is H-shaped in outline as illustrated in Figure 4, and secured between the base 3 and side wall 2 of the case are a pair of spaced apart channel rubber members 9 and 10 adapted to receive one end of the frame 8, as best shown in Figure 2, while the opposite end of said frame is secured to base 3 by means of rubber grommets, designated generally as 11. The grommets are conventional and are of spool-like form in cross-section being held to the base 3 by the screw threaded nut and screw arrangement as shown at 12.

The frame 8 carries a stud shaft 13, which rotatably supports, above the said frame 8, a turntable 14. The turntable 14 on its base side is provided with a boss 15 which surrounds the stud shaft 13, and said turntable is provided with a circumferentially grooved flange 16 which functions as a pulley as hereinafter described. The top of the turntable has secured thereto by means of screws 17 received in screw threaded embossments 18, a disc 19 having a sound groove of some character upon its surface.

A supporting bracket 20 for an electric motor 21 is secured to the frame 8 by means of rubber grommets 22 at three points, as illustrated in Figure 4. The securing is by means of the threaded nut and screw arrangement identical with that shown at 12. The supporting bracket is of Z-shaped form, the motor being supported in elevation above the surface of the record 19 as best illustrated in Figure 2. In referring to the motor, I, of course, include the casing that surrounds the working parts of said motor. The motor shaft extends, at both ends thereof, through the said casing, the shaft being designated as 23, and one end of said shaft carries a knurled head 24 which extends through the cover 4, while the opposite end of said shaft carries a pulley 25. Spaced from pulley 25 and carried on a stud shaft 26 secured to the motor casing, is a pulley 27. Carried on said stud shaft 26 below pulley 27 is a pulley 28, the circumferential groove of which is in the plane of the grooved flange 16 of the turntable. A continuous belt 29 extends between pulleys 25 and 27 and a continuous belt 30 extends between pulleys 16 and 28. The ratio of diameters of the several pulleys is such as to drive the turntable at a certain revolution per minute in order that when the record is played, proper pitch is maintained.

The case 1 is adapted to carry small batteries 31, and in the present instance two batteries are shown, with each battery confined with a pocket 32 and 33. The pockets are located at corners of the case, with the motor positioned intermediate the pair of batteries. It will be observed that the pockets are formed by providing, in each instance, a pair of separated and curved walls 34 and 35. As shown in Figure 15, two contact arms 36 and 37 are spacedly carried by the frame 8 so as to effect a path for current flow between the base of one battery, to-wit: the cathode and the anode of the other battery, one battery being upright within one of the pockets, while the other battery has its base end faced upwardly. This current path from the contact arms is effected by means of a bus rod or similar element 38 to post 39, which carries a switch arm 40 formed of resilient metal. A contact post is provided at 41, and the switch arm 40 normally engages said post. The post, in turn, is connected to a bus rod or similar elements 42 and a wire connection 43 to one of the brush contacts 44 for the motor, the other brush contact 45 being connected by wire 46 to the contact arm 36. This character of wiring is required for the reason that the frame 8 is preferably formed of some material, such as a plastic, which is non-conductive of electricity. The cover 4, which is likewise preferably formed of plastic, carries a bridging contact arm 47. The contact arms engage the anode and cathode of the pair of batteries as best illustrated in Figure 3.

From the description so far given, it is evident that if the switch arm 40 engages the contact post 41, that an electrical path will be completed through the batteries to the motor and cause rotation of the turntable 14 at a speed determined by the pulley diameters between the motor and the turntable.

I have provided an acoustical reproducer 48 which is of cup-like form in that it has a base 49 and a side wall 50, preferably formed from a material which has no tonality. I have provided a cone 51 which is mounted upon one edge of a ring 52, which ring fits within the confines of the side wall 50 and is provided with an annular flange 53 which engages the rim of the side wall 50. The cone 51 is centrally provided with a plane or flat area 54 and a flat disc 55 overlies the said flat area 54. The ring 52 dependingly carries on its lower edge, a pair of lugs 56 and 57, the ring at this zone being enlarged as to depth as shown at 58 and likewise transversely thickened as shown at 59 in Figure 7. The said lugs are provided with transverse screw-threaded bores which adjustably accommodate the screw-threaded shanks of a pair of pivot pins 60 and 61. The pivot pins engage opposite ends of a stylus bar 62 provided with an angular bore 63 within which is received a stylus 64. The stylus shank is held within said bore of the stylus bar by screw 65. A rigid rod 66 extends from one side of the stylus bar to the center of the cone 51, and a link 67 connects the disc 55 with said rod. As shown, the base of the acoustical reproducer cup is provided with a transverse bore 68 through which the stylus 64 passes.

The acoustical reproducer is adapted to be resiliently supported above the record and in such manner that the said reproducer may freely oscillate in a horizontal plane above the record and likewise be restrained against movement vertically to the end that the stylus will not jump the record groove if rough treatment is accorded the instrument, as a whole. Likewise there is provided means whereby the stylus may be properly placed within the groove at the commencement of the record, and upon completion of the playing of the record, the stylus and its reproducer may be lifted from the record groove and swung to a commencement position followed by lowering the stylus into the groove. This portion of the invention will now be described. The H-frame is provided with a tubular post 69 at one corner of said frame (see Figure 5). This post is provided with a tapered outer surface. A sleeve post 70 fits on the tapered surface of the post 69. Sleeve post 70 is reduced in diameter to provide a shoulder at 71 and a reduced diameter portion 72, of key outline, in that it has a radial extension 73. A member 74 has a transverse bore which conforms to the outline of the portions 72 and 73 so as to key said parts together and which member 74 is provided with extensions 75 and 75*a*. Interposed between member 74 and shoulder 71 is an A-frame 76, said A-frame being provided at its apex portion with a bore conforming in outline to the portions 72 and 73. As shown in Figure 5, the base 49 of the acoustical reproducer is carried by the extending arm portions of the A-frame, being secured to said arms by means of screws 77. As the A-frame is preferably formed of spring-like material, I have provided an adjustment means whereby I may vary the pressure of the stylus 64 within the groove of the record. This means comprises a screw 78 carried by the extension 75 and bearing against an arm of the A-frame.

To hold the parts of the post in position of assemblage, I have provided the following members: a coil spring 79 which is confined within the bore of post 69, one end of said spring being secured to a tie-piece 80, which bridges the bore in the tubular post 69, with the opposite end of said spring secured to a projection on one end of a bolt 81. This bolt is capable of slide movement within a reduced bore 82 in the upper part 72 of the sleeve 70. The upper end of said bolt caries a nut 83 and a washer 84, the washer overlying the bore 82 and engaging the top surface of member 74. The bolt carries a flange or collar 85 for holding the bolt in a defined position when the nut 83 is tightened. Thus, the spring 79 controls relative telescopic movement between members 69 and 70.

The sleeve post 70 carries adjacent its base and extending radially outwardly therefrom, an arm 86. This arm is provided with a depending stud 87 which functions as a stop. This stud is passed through an arcuate slot 88 in the main frame 8. This arcuate slot is of a length which permits the stop to engage the ends thereof when the sleeve 70 is rotated. In one position, the stop limits the motion so that the stylus will be directly over the commencement portion of the groove of a record and in the second position, the stop will function to limit further movement of the arm 86 when the end of the groove of the record is reached. The outermost end of the arm 86 is reduced in thickness at 89 to provide a shoulder at 90. Pinned for swinging motion on the part 89 is a lever 91 which functions as a trigger. This lever is provided with an angular extremity 92 and with a flattened area 93 adjacent the shoulder 90. A coil spring 94 surrounds pin 95 between the lever and the portion 89, one end of said spring engaging the back of said lever as shown at 96 to urge said lever to swing in a clockwise direction on its pin 95. The main frame 8 carries on its top surface a protuberance or wall 97. This wall is of extended length as shown in Figures 8 and 9, and one end of said wall terminates in a right angled wall portion 98. The arrangement is such that the angular extremity or hook 92 of the trigger lever 91 may engage the wall 97 to hold the lever 86 against movement. It is to be observed upon reference to Figure 4, that at the commencement position for playing a record, the trigger 91 does not engage the protuberance or wall 97 and that said engagement occurs when the acoustical reproducer has moved to the end of the record groove, at which time the trigger will have the position shown in Figure 8. In the position shown in Figure 8, the angular extremity 92 will strike the outermost end of switch arm 40 and move the same from contact with the post 41, thus breaking the electrical circuit to the motor 21.

The mechanism for raising and lowering the sleeve 70 and for rotating said sleeve will now be described. The top surface of the main frame 8 is provided with a post 99, to which a lever 100 is fulcrumed by means of pin 101. The lever has a right angled extremity 102 and said extremity is positioned beneath a protuberance or lug 103 carried by sleeve 70. It is to be observed that the lever is guided between the right angled wall portion 98 of the wall 97 and a parallel wall surface 104 of member 105 rising from the top surface of the main frame 8 (see Figures 8 and 9). The end of the lever 100 opposite the right angled extremity 102 is connected to an arm 105 by means of a pin 106. Carried on the pin 106 is a bell crank 107. One crank arm 108 carries an offset end 109 which overlies the top edge of lever 100, the other crank arm 110 is offset relative to the plane of crank 108. The sleeve post 70 carries a stud 111 and extending between the extremity of crank arm 110 and said stud is a link 112. Interposed between the bottom edge of the lever 100 and a socket portion 113 in the main frame 8, is a coil spring 114. This coil spring normally tips the lever 100 on the fulcrum pin in a clockwise direction.

The cover is provided with an opening 115 and a circular depending flange 116. Within said opening and confined by said flange, is a button 117, the arm 105 being secured at its upper end to said button as shown at 118. Depression of the button will, of course, rock the lever 100 and compress the spring 114.

The operation, uses and advantages of the invention just described are as follows:

In Figure 1, the acoustical reproducer has just commenced to play the record. The stylus is approximately one-eighth inch from the edge of the record and the parts of the apparatus are as shown in their relative positions in Figure 2. As the record is played, the lug 87 moves within the arcuate slot 88 from the position of Figure 4 to that of Figure 8. When the end of the record groove has been reached, the lug 87 will strike one end of the wall bounding the arcuate groove and prevent further movement of the stylus 64, at which time the spring actuated trigger 91 will have its angular extremity 92 in latched engagement with the wall 97. The extremity 92 will contact the extremity of the switch arm 40 and move it from the post 41, thus breaking the electric circuit between the battery and the motor. The push button 117 and lever 100 with the bell crank 107 will be in the position shown in Figure 6. If now the push button 117 is depressed, the arm 105 will rock the lever 100 counterclockwise and bring the rounded portion 119 of the bell crank arm 108 into engagement with the top surface of the main frame as shown in Figure 10. During the playing of the record, the extremity 102 of lever 100 has been positioned beneath the lug 103 carried by the sleeve post 70, as shown in Figures 11 and 12. It will be observed that the extremity 102 is provided with an extension 120 which extends above the top edge of said portion 102. Thus in Figure 11, the lug 103 is positioned above the extension 120 and after the record play has been completed, the lug 103 is positioned directly above the top edge of said extension 120. When the button 117 is depressed within its socket and guide flange 116, the curved nose or rounded portion 119 of the bell crank engages the top surface of the main frame and in so doing tensions the link or pull rod 112. The rocking of the lever 100 will bring the extension 120 into engagement with the lower edge of the lug in the manner shown in Figure 13, to raise the sleeve 70 relative to post 69 against tension of the spring 79, the distance indicated between the arrows in Figure 13 at 121. Continued depression of the button 117 to rock lever 100 will move the bell crank 107 from the position shown in Figure 10 to the full line position thereof shown in Figure 6 and by so doing, the link 112 will rotate the sleeve post 70 to move the A-frame and the acoustical reproducer, with the stylus 64 raised above the groove of the record, to the starting position of the record groove, the lug 87 retraversing the arcuate slot 88 to stop counterclockwise rotation of the sleeve 70. At this time the extension 120 will have moved to the position shown in Figure 14 relative to the lug 103, to lock the sleeve 70 against any counter-rotation, the sleeve 70 returning to the position shown in Figure 5, under tension of the spring 79 with the parts again assuming the position shown in Figure 4, which permits a replaying of the record. It will be specifically observed that when the end 92 of trigger 91 is released from the wall 97, the switch arm 40 again engages the contact post 41 to complete an electrical circuit to the motor and rotate the turntable. Therefore, during the return movement of the reproducer and its stylus to the starting position of the record, the turntable is rotating so that immediately upon a lowering of the sleeve 70 to place the stylus 64 in the record groove, the record commences playing. It will be seen from Figures 13 and 14 that when the sleeve 70 is raised by the extension 120 resultant upon the depressing of button 117, that said raising actually occurs prior to the bell crank rotating the sleeve. This is well illustrated in Figure 10 wherein the distance which the sleeve has been raised to in turn lift the stylus 64 from the record groove is indicated by the distance between the arrows 121 and that at the time the rounded portion 119 of the bell crank arm engages the top surfaces of the main frame, the sleeve is further raised the distance indicated between the arrows 122, and during rotation of the said sleeve.

If it is desired to have the stylus 64 engage the record groove with more compression, adjustment is effected by turning the screw 78 in one direction.

The knurled knob 24 may be engaged by the fingers so as to rotate the motor shaft if this becomes necessary. Furthermore, the cover is easily removed from the case 1 by removing the screws 6 and 7, whereby all parts within the case are accessible. The rubber mountings for the main frame and for the motor assure that the device will be substantially vibrationless.

It has been found that the acoustic reproducer shown functions well in actual practice. The side wall of the reproducer may be provided with one or more perforations to allow air to enter therein although air will enter through the bore 68. As the paper mache cup has no tonality, it gives off no tone of its own but does amplify the vibration of the cone 51. Generally a cone of the character shown requires a baffle board in order to function. However, the present construction does produce superior tonal results.

A device of this character may be exceedingly compact and small, even smaller than that shown in Figures 1 and 2. Such a construction may be placed within a doll or other toy and due to the positive means and method employed in assuring that the stylus may move within the record groove without any jump therefrom, the device may be turned upside down, sideways, or otherwise moved.

I claim:

1. In phonograph construction, a frame, a turntable rotatably carried by said frame, the said turntable adapted to have secured thereto a record having a sound groove, a post on said frame, a sleeve post slidably carried on the first post, a coil spring secured between the posts for urging the sleeve post to move in one direction relative to the first post, a resilient frame carried by the sleeve post, a reproducer supported by said resilient frame, said reproducer having a stylus for reception in the groove of the record; a lug projecting from the sleeve post, a pivoted lever, one end of which lever is adapted to have contact with the lug on the sleeve post to raise the sleeve post against the tension of the spring when the said lever is moved in one direction to thereby raise the reproducer and its stylus above the groove of the record, a bell crank carried by said lever, said sleeve post provided with a radial stud, and a link between the radial stud and one arm of said bell crank, the opposite arm of said bell crank adapted to have contact with the frame when the lever is depressed in one direction to tension said link and thereby rotate said sleeve post and position the stylus of the reproducer at the commencement of the record groove.

2. In combination, a frame, a lever fulcrumed to said frame, a post carried by the frame, a sleeve post surrounding the first post, said sleeve post provided with a radial lug, one end of said lever being offset, the said offset end being positioned beneath the said lug, a bell crank pivoted to the opposite end of said lever, a link radially secured at one end to said sleeve post and with the opposite end secured to one arm of said bell crank, rocking of the said lever in one direction causing the offset end of said lever to engage beneath the lug to lift the sleeve post relative to the first post, the second bell crank arm engaging the frame to rock the said bell crank and to tension the link to rotate the sleeve post.

3. In combination, a frame, a lever fulcrumed to said frame, a post carried by the frame, a sleeve post surrounding the first post, said sleeve post provided with a radial lug, one end of said lever being offset, the said offset end being positioned beneath the said lug, a bell crank pivoted to the opposite end of said lever, a link radially secured to said sleeve post and to one arm of said bell crank, rocking of the said lever in one direction causing the offset end of said lever to engage beneath the lug to lift the sleeve post relative to the first post, the second bell crank arm engaging the frame to rock the said bell crank and to tension the link to rotate the sleeve post, and means limiting the degree of rotation of said sleeve post in one direction.

4. In combination, a frame, a lever fulcrumed to said frame, a post carried by the frame, a sleeve post surrounding the first post, said sleeve post provided with a radial lug, one end of said lever being offset and notched, the said offset end being positioned beneath the said lug, a bell crank pivoted to the opposite end of said lever, a link radially secured to said sleeve post and to one arm of said bell crank, rocking of the said lever in one direction causing the offset end of said lever to engage beneath the lug to lift the sleeve post relative to the first post, the second bell crank arm engaging the frame to rock the said bell crank and tension the link to rotate the sleeve post, the notch of said offset end, upon completion of rotation of the sleeve post in one direction, engaging one side of the lug on said sleeve post to hold the sleeve post against rotation in an opposite direction until said end is fully lowered and the sleeve post returns to normal position relative to the first post.

References Cited in the file of this patent

UNITED STATES PATENTS

| | | |
|---|---|---|
| 1,655,196 | Parolini et al. | Jan. 3, 1928 |
| 1,795,154 | Weinberger | Mar. 3, 1931 |
| 2,063,578 | Berglund | Dec. 8, 1936 |
| 2,162,006 | Franck et al. | June 13, 1939 |
| 2,244,506 | Staszkiewiecz | June 3, 1941 |
| 2,309,352 | Offen | Jan. 26, 1943 |
| 2,416,583 | Hartley et al. | Feb. 27, 1947 |
| 2,485,575 | Deaver | Oct. 25, 1949 |
| 2,509,054 | Davis | May 23, 1950 |
| 2,568,671 | Vistain | Sept. 18, 1951 |

FOREIGN PATENTS

| | | |
|---|---|---|
| 494,545 | Germany | Mar. 31, 1928 |
| 624,721 | Great Britain | June 15, 1949 |